May 3, 1938.    B. GOLDMAN    2,115,809
MEANS FOR AUTOMATICALLY MOVING A ROTATING BLADE IN AXIAL DIRECTION
Filed June 4, 1935    2 Sheets-Sheet 1

INVENTOR
Bronislaw Goldman
BY  S. Loral
ATTORNEY

May 3, 1938.   B. GOLDMAN   2,115,809
MEANS FOR AUTOMATICALLY MOVING A ROTATING BLADE IN AXIAL DIRECTION
Filed June 4, 1935   2 Sheets-Sheet 2
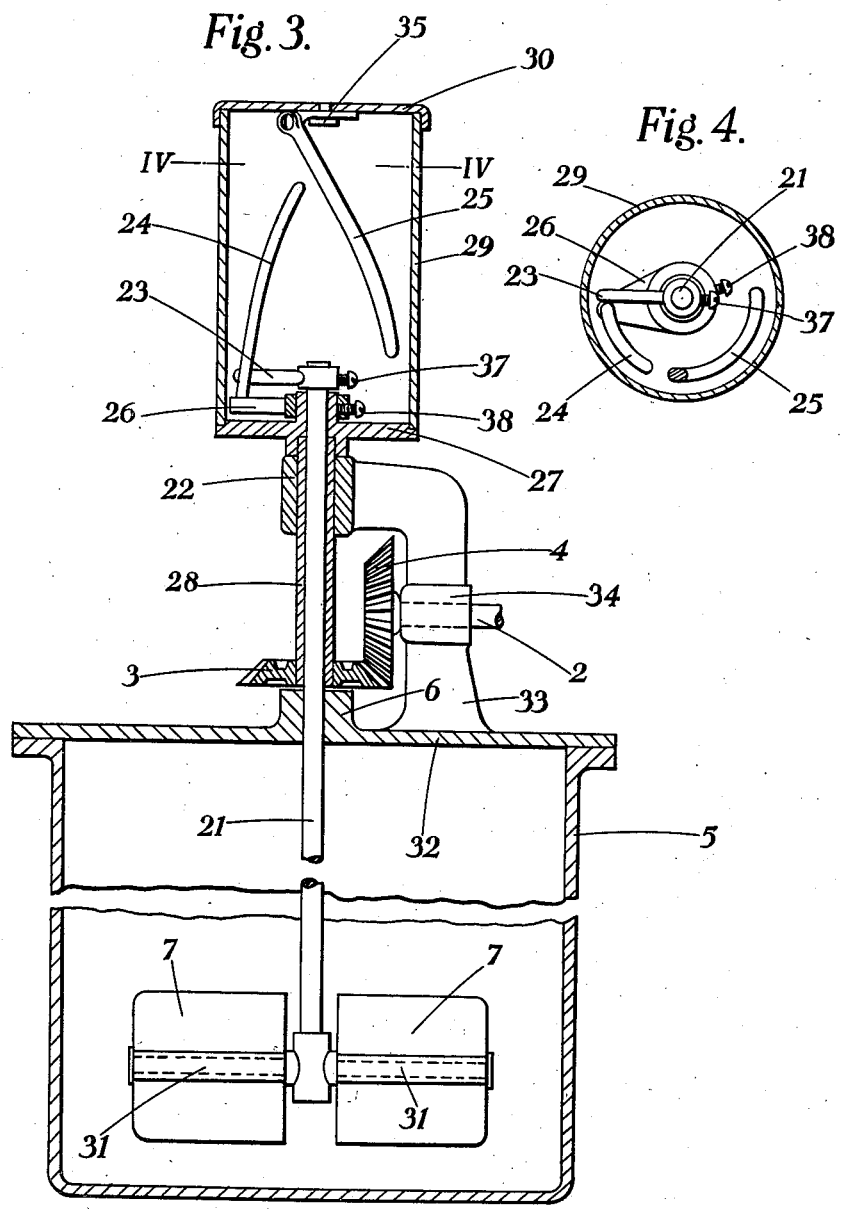
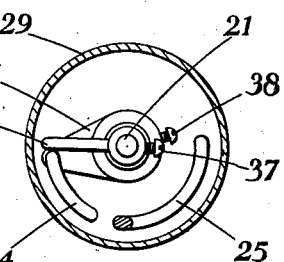
INVENTOR
Bronislaw Goldman
BY S. Loreal
ATTORNEY Patented May 3, 1938

2,115,809

UNITED STATES PATENT OFFICE 2,115,809

MEANS FOR AUTOMATICALLY MOVING A ROTATING BLADE IN AXIAL DIRECTION

Bronislaw Goldman, Warsaw, Poland

Application June 4, 1935, Serial No. 24,845
In Germany May 16, 1934

7 Claims. (Cl. 259—99)

Applications have been filed in Germany on the 16th May, 1934 and 25th July, 1934 and Great Britain on 16th May 1935.

The present invention relates to a method of and means for automatically moving in a longitudinal direction a rotating blade or equivalent member, for instance, a rotating blade or equivalent member of a horizontal or vertical mixing, agitating or like apparatus, for instance, an apparatus for mixing solid substances in the form of small pieces or grains, liquid masses and particularly liquids containing specifically heavier solid or plastic substances in suspension.

In such apparatus, the specifically heavier solid or plastic substances, such as salts, earths, granular material etc. contained in the mixture accumulate during the standstill of the apparatus upon the bottom of the container, dropping owing to their higher specific weight in the lighter liquid or solvent. In such cases the apparatus can be re-started or brought into operation only by using very considerable power. Frequently, however, the agitating or mixing device is completely locked, and it is then necessary to lift the mixing blade or blades which have become jammed, by a separate device from the sediment, which involves a rather complicated operation.

According to the invention these difficulties are avoided by utilizing the reaction forces which are set up during the movement of the blade in the medium for moving the blade or blades to and fro or for lifting and lowering the blades. This movement of the agitating or mixing blade is obtained by means of guides upon which the blade can slide. In order to obtain a proper adaptation to various conditions, and more particularly to the medium, the guides are constructed either adjustable or elastic. According to the requirements, the guides may be spiral or straight. It is also possible to give the blade according to the purpose for which it is used and the nature of the medium, a particularly suitable shape and also a suitable weight in order to control the speed of the longitudinal displacement. The blade may, for instance, be given a helical shape, or that of a downwardly directed wedge. Obviously, the blade may also be arranged eccentrically with regard to the middle axis of the container.

The drawings show by way of example two constructions of apparatus suitable for carrying out the invention.

Figs. 3 and 4 show a second construction in which the blade moves together with its shaft.

Fig. 1 is a sectional elevation of the first construction,

Figure 1:
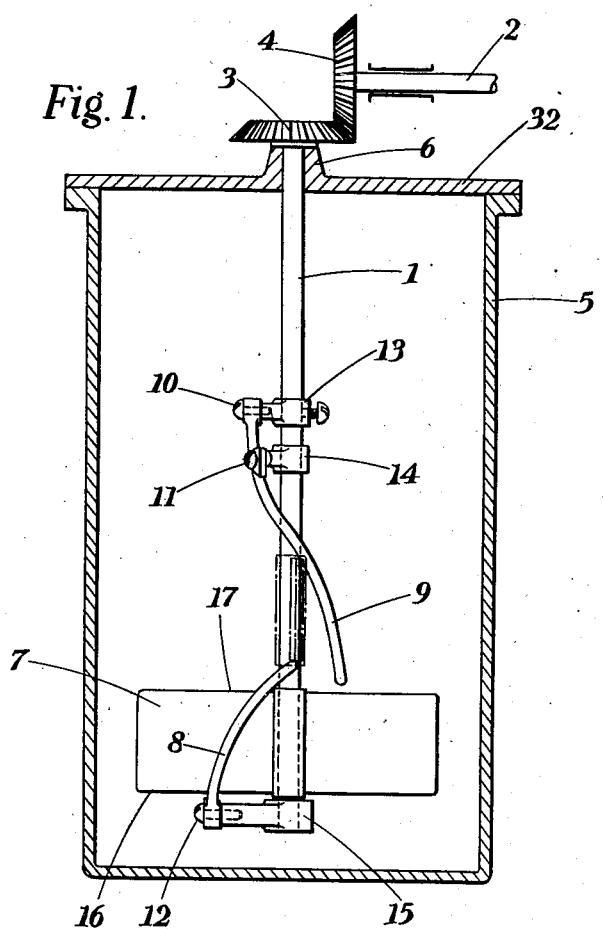
Figs. 1 and 2 show the first construction in which a blade moves upon its shaft.
Figure 2:
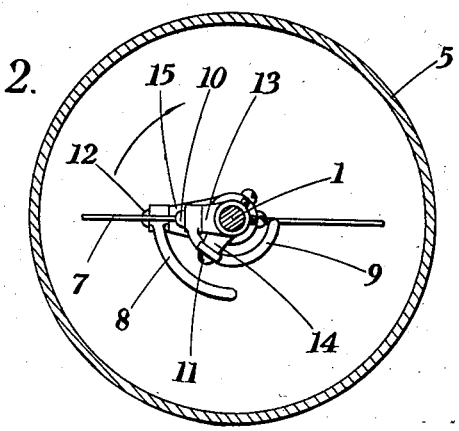

Fig. 2 a cross section corresponding to Fig. 1,

Fig. 3 is a sectional elevation of the second construction, and

Fig. 4 a cross section corresponding to Fig. 3.

Referring first to Figs. 1 and 2 which illustrate the application of the invention to a mixing apparatus, 1 indicates a shaft driven from a driving shaft 2 by means of bevel gears 3 and 4 and mounted in the casing 5 of the mixing apparatus by means of a bearing 6 carried by a cover 32. The mixing blade 7 is loosely mounted upon the shaft 1 so that it can slide thereon up and down. With the shaft are connected two spiral guide members 8 and 9, the inclinations of which are adjustable by means of screws 10, 11 and 12 and levers 13, 14 and 15. The guide member 8 serves for lifting the blade 7, whilst the guide 9 serves for moving the blade downwards. The operation of this construction is as follows:—

Upon rotation of the shaft 1, the guide members 8, 9 are also rotated. The blade 7 bears owing to the occurring resistances with its lower edge 16 against the guide member 8 and is lifted into the position indicated by chain dotted lines, sliding along the guide member. As soon as the blade has reached this position, its upper edge 17 strikes the guide member 9. The blade is now, owing to the occurring reaction forces, pressed slowly downwards along the guide member 9. By this means the lighter components or ingredients of the mixture are first mixed with the liquid and then gradually the heavier parts lying near the bottom. The blade then slides into its lowest position in which it remains continuing its rotation with the shaft. If any unexpected considerable resistance should occur, the blade can easily yield and the operation described above is repeated. By suitably setting or adjusting the guide members in accordance with the speed or number of revolutions, it is possible to cause the blade to move continuously to and fro or up and down.

It may be pointed out that the invention can be applied both to vertical and horizontal mixing machines, beaters, for instance, butter making machines, disintegrating apparatus, conveying apparatus having blades, pumps, and generally to any kinds of machinery in which blades are used. The invention is also applicable to the rotating parts of shaking sieves.

Instead of having a blade which moves along its shaft, the blade may be arranged fixed upon its shaft and the shaft may be moved up and down or to and fro. This construction is shown in Figs. 3 and 4.

In this construction. 5 indicates a container of a mixing or agitating apparatus in which is rotatably mounted by means of bearings 6 and 22, a shaft 21 driven from a shaft 2 by means of bevel gears 3 and 4. The bearing 6 is carried by a cover 32 and the bearings 22 and 34 are carried by a bracket 33 arranged upon the cover 32. With the shaft 21 is rigidly connected the mixing or agitating blade 7, 7. The shaft 21 is turnably and longitudinally slidable in the bearings 6 and 22 and carries upon its upper end an arm 23 adapted to co-operate with guide members 24 and 25. The guide member 24 is connected at its lower end by means of an arm 26 and screw 38 to a plate 27 which latter is fixedly connected by means of a tubular shaft 28 with bevel gears 3 so that upon rotation of the shaft 2 the plate 27 and the guide member 24 are rotated. 29 is a casing fixed to and rotating with the plate 27 and closed by a cover 30 to which is fixed by means of a screw 35 a second guide member 25 at its upper end. Upon rotation of the shaft 2, the tubular shaft 28 and the guide members 24 and 25 are rotated and this rotation is transmitted by the arm 23 to the shaft 21 and the blade 7. If now, the blade during rotation encounters a resistance in the medium in which it rotates, the blade will together with the shaft 21 be adjusted in a sense opposite to that of the direction of rotation by means of the arm 23 sliding upon the guide members 24 and 25 up and down. The guide members 24 and 25 might also be arranged upon the inner wall of the casing 29 or might be cut or formed in the casing. The blade 7 or either of its two halves may be made adjustable relatively to the shaft arm 31 upon which it is mounted for the purpose of regulating the speed of its vertical movement, or for the purpose of adjusting its action. This adjustment of the blade might be effected by means of hinges or by means of a bevel gear operated from above by means of a hollow shaft. The speed of the longitudinal movement of the blade may also be regulated by means of a piston connected with the shaft 21, for instance, arranged in the casing 29 so as to slide with the shaft up and down. By means of a suitable locking device, for instance, a centrifugal regulator, vertical movement of the shaft may be suitably stopped or checked. The casing 29 may also be constructed as a belt pulley for driving the blade. In that case the bevel gear transmission may be entirely omitted. The arm 23 and the guide members 24 and 25 may be also duplicated in order to obtain double guiding of the shaft.

I claim:

1. Means for axially moving a rotating blade, comprising in combination: a container for a medium to be set in motion by the blade; a shaft rotatably mounted in said container; means for rotating said shaft; a single blade mounted upon said shaft; a guide member connected to, but spaced laterally away from said shaft and rotating simultaneously therewith; said guide member engaging the edge of said blade and thereby causing axial movement thereof during the rotation; and said guide member and said blade being so mounted as to permit of a limited turning movement of said blade relatively to said guide member during the rotation.

2. A mixing and agitating apparatus comprising in combination: a container for the material to be treated; a shaft rotatably mounted in said container; a single blade adjustably mounted upon said shaft; means for lifting and lowering said shaft together with said blade during rotation operable by the reaction of the material treated and comprising two guide members rotating simultaneously with said shaft and a member carried by said shaft and adapted to co-operate with said guide members by contact therewith to cause axial movement of said blade, said guide members being so constructed that by successive engagement by contact with said last mentioned member during rotation, they cause said shaft and blade to slide successively in opposite directions.

3. Means for axially moving a rotating blade comprising in combination: a container for a medium to be acted upon by the blade; a shaft rotatably mounted therein; means for rotating said shaft; a single blade turnable and axially slidable upon said shaft and a pair of elongated guide members carried by said shaft, said guide members and said blade being so constructed and arranged as to engage one another and thereby successively to cause axial movements in opposite directions of the blade in sliding contact with said guide members during rotation under the action of a reaction force set up in the medium.

4. Means for axially moving a rotating blade comprising in combination: a container for the medium to be acted upon by the blade; a shaft rotatably mounted in said container; a single blade mounted upon said shaft, a rotatable casing; means in said casing for axially sliding said shaft with said blade in opposite directions during rotation; said means comprising: a guide member carried by said casing and spaced from said shaft and a guide member carried by said shaft co-operating with said other guide member.

5. A mixing and agitating apparatus comprising in combination: a container for the material to be acted upon; a shaft rotatably mounted therein; a single blade carried by said shaft in said container, means for rotating said shaft in one direction and for moving said blade successively axially in opposite directions operated by reaction forces occurring in the material during rotation of said shaft and blade in said one direction only.

6. A mixing and agitating apparatus comprising in combination: a container for the material to be treated; a shaft rotatably mounted in said container; means for rotating said shaft; a blade turnably and slidably mounted upon said shaft; and two guide members each fixedly mounted upon said shaft and having ends directed towards one another; said guide members limiting the turning movement of said blade relatively to said shaft and being so constructed that by successive engagement by contact with said blade during rotation they cause the blade to slide upon the shaft successively in opposite directions, the operation being such that upon leaving the one guide member said blade contacts with the other guide member, substantially as described.

7. A mixing and agitating apparatus comprising in combination: a container for the material to be treated; a shaft rotatably mounted therein; a single blade mounted upon said shaft; means for axially moving said shaft together with said single mixing and agitating blade, comprising a guide member spaced away laterally from and rotating simultaneously with said shaft; and a member carried by said shaft co-operating with said guide member by contact therewith to effect axial movement of said blade.

BRONISLAW GOLDMAN.